UNITED STATES PATENT OFFICE.

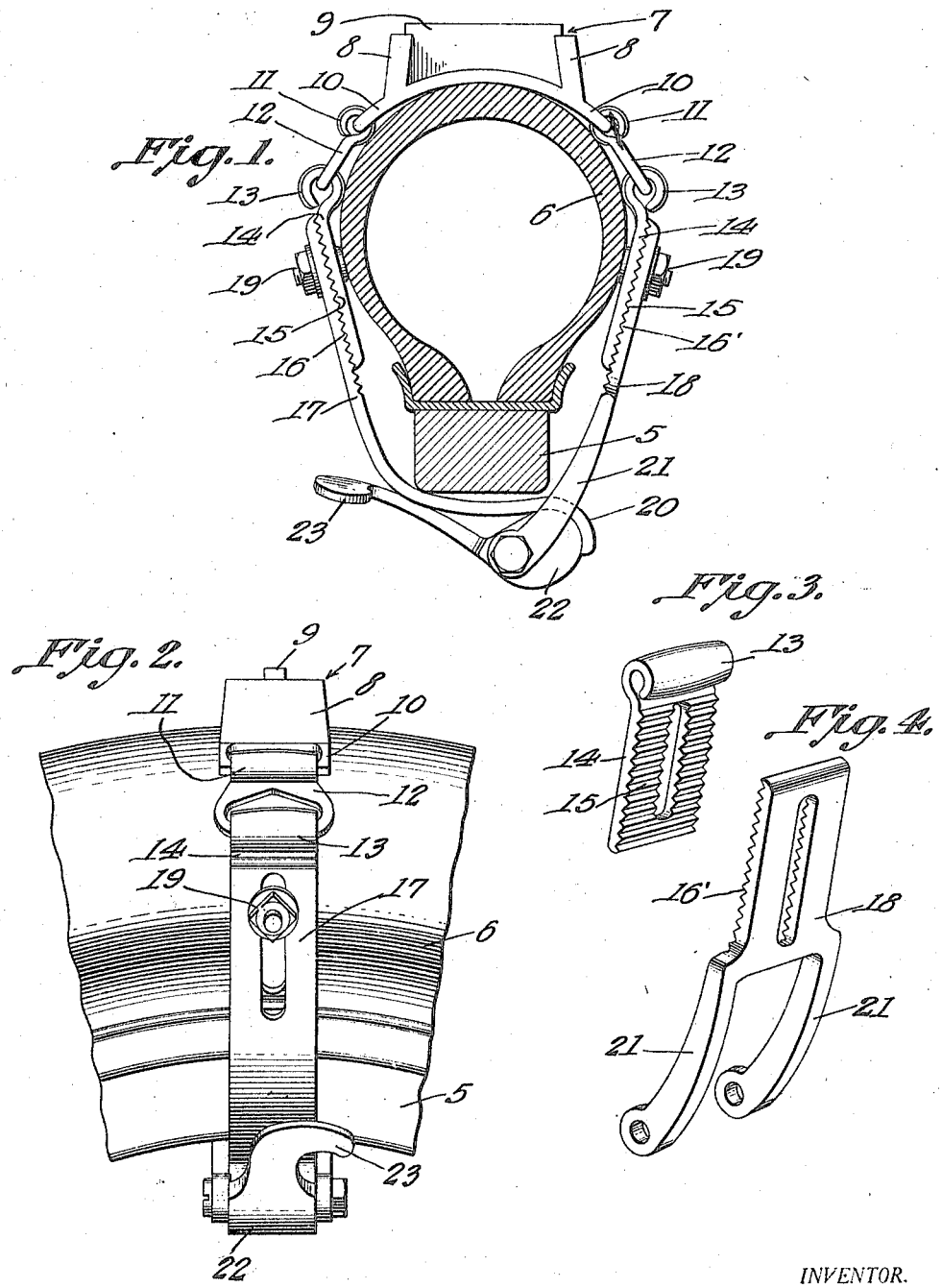

FRANK M. STURGIS, OF FORSYTH, ILLINOIS.

FLEXIBLE MUD-LUG.

1,393,252. Specification of Letters Patent. Patented Oct. 11, 1921.

Application filed April 8, 1920. Serial No. 372,334.

*To all whom it may concern:*

Be it known that I, FRANK M. STURGIS, a citizen of the United States, residing at Forsyth, in the county of Macon and State of Illinois, have invented certain new and useful Improvements in Flexible Mud-Lugs, of which the following is a specification, reference being had therein to the accompanying drawing.

This invention relates to improvements in flexible mud lugs for traction vehicles, that is, a device adapted to be attached to the felly and tire of a motor truck or motor car and which is provided with adjustable means whereby the same can be used upon varying diametered tires and be positioned in place or removed very rapidly.

A further object of this invention is the provision of a mud lug provided with a peculiar adjusting means and locking device whereby the same may be readily and quickly attached and adjusted to conform with varying diameters of tires, said mud lug being flexibly connected so as to be easily handled in the attaching or detaching operation.

A still further object of this invention is the provision of a flexible mud lug which is simple, durable and inexpensive in construction and thoroughly efficient and practical in use.

In the accompanying drawings:

Figure 1 is an end view of the complete lug, showing a tire and felly in dotted lines with the lug in position thereon.

Fig. 2 is a side elevation of the complete lug.

Figs. 3 and 4 are detail views thereof.

Referring to the drawings, the numeral 5 designates the felly and 6 the tire which may be of any desired shape or form. The mud lug consists of the ground engaging member 7 having the two parallel and spaced lugs 8 with the connecting rib 9, thus providing means for giving longitudinal traction as well as lateral traction when the lug is in position upon the tire. The traction engaging member is further provided upon opposite ends with the two slotted projections 10 to which are connected the cylindrical portions 11 of the oppositely disposed links 12 while connected to each link through the respective sleeve 13 is the slotted plate 14. Each one of these plates 14 is provided with the serrated or toothed surface 15 which is adapted to coöperate with the serrated or toothed surface 16 and 16' of the respective slotted members 17 and 18. These parts slightly vary in construction but the bolts and nuts 19 are employed to hold the slotted members together in the desired adjustable position and by this means the connection at this point may be shortened or lengthened according to the size of the tires upon which the device is used.

The member 17 is bent or formed with the hook 20 at the terminal thereof and such member 17 is sufficiently long to engage the felly and thus extend the hook terminal so as to fit between the terminals 21 of the member 18 which has journaled between such members the cam 22 for engagement with hook 20 as clearly illustrated. This cam is provided with the hook shaped handle 23 by means of which the cam may be readily operated to lock the lug in the desired adjusted position upon the felly and tire.

From the foregoing description, it is evident with a flexible lug constructed according to this invention that various sizes do not have to be carried in stock according to the tire and felly and same can be adjusted at will to fit various sizes and due to the cam locking device can be quickly attached or detached so as to present the traction member in the proper relative position.

What I claim as new is:

A flexible mud lug consisting of a tread device having a concaved plate for engaging the tread of the tire, the opposite ends of which are slotted, two flexible links, one mounted in each of said slots, two slotted plates flexibly connected to each link and adapted to be disposed upon opposite sides of the tire, the outer faces of which are roughened, and two locking members having flattened and slotted terminals for coexpansive relation to the outer faces above referred to, the same also being roughened, a bolt for locking the abutting portions together in an adjusted position, and a quick acting lock carried by the terminals of said locking members for removably connecting the same together.

In testimony whereof I affix my signature.

FRANK M. STURGIS.